United States Patent Office 3,538,080
Patented Nov. 3, 1970

3,538,080
1-AZIRIDINYL ALKYL PHOSPHORAMIDES
George E. Ham, Lake Jackson, Tex., assignor to The Dow Chemical Company, Midland, Mich., a corporation of Delaware
No Drawing. Filed Dec. 22, 1966, Ser. No. 603,789
Int. Cl. C07f 9/56
U.S. Cl. 260—239   4 Claims

ABSTRACT OF THE DISCLOSURE

A process for preparing 1-aziridinyl alkyl phosphoramides from aziridinyl phosphoramides, (e.g., tris(1-aziridinyl)phosphine oxide), and an aziridine (e.g., ethylenimine) and novel bis and tris (1-aziridinyl alkyl) phosphoramides so produced. At least an equimolar amount of the aziridine is contacted with aziridinyl phosphoramide at a temperature between 50° and 250° C. under at least autogenous pressure for a time sufficient to allow the resulting reaction to go to completion. The bis and tris- (1-aziridinyl alkyl) phosphoramides are particularly useful for curing acid (e.g., carboxylic) terminated polymers.

FIELD OF THE INVENTION

This invention relates to a novel process for preparing compounds containing from one to three 1-aziridinyl alkyl groups and to novel compounds containing two or three 1-aziridinyl alkyl groups so produced. More particularly, this invention relates to novel bis and tris(1-aziridinyl alkyl) phosphoramides and to a process for preparing 1-aziridinyl alkyl phosphoramides from 1-aziridinyl phosphoramides and aziridines.

DESCRIPTION OF THE PRIOR ART

Aziridinyl phosphoramides, such as tris(1-aziridinyl) phosphine oxide, are known in the art. They are typically prepared, for example, from an aziridine and phosphorus oxychloride. Such aziridinyl phosphoramides have found only limited use as curing agents for acid terminated polymers (e.g., carboxy terminated polybutadiene) because they are isomerized during curing, resulting in unpredictable and often unsatisfactory cure properties and because they tend to degrade on aging, causing "cure reversion."

SUMMARY OF THE INVENTION

According to the present invention, novel bis and tris(1-aziridinyl alkyl)phosphoramides, which are substantially free of the above undesirable characteristics when used as curing agents for acid terminated polymers, are provided by modifying 1-aziridinyl phosphoramides with an aziridine. The novel compounds of this invention have the general formula:

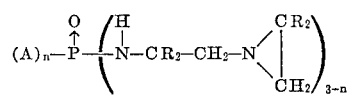

wherein:

(1) R is, independently in each case, hydrogen or an alkyl group having from 1 to 4 carbon atoms,
(2) A is $(R_1)_2N-$ or $R_1O-$,
(3) $R_1$ is an alkyl group having from 1 to 4 carbon atoms, and
(4) $n$ is 0 or 1.

The compounds having the above general formula, as well as 1-aziridinyl alkyl phosphoramides wherein $n$ in the above general formula is 2, may be prepared by contacting at least an equimolar quantity of an aziridine having the formula:

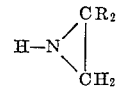

with an aziridinyl phosphoramide having the formula:

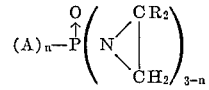

wherein A and R are as defined previously, and $n$ is 1, 2, or 3, at a temperature between 50° and 250° C. under at least autogenous pressure for a time sufficient to allow the resulting reaction to go to completion.

DETAILED DESCRIPTION OF THE INVENTION

Operable aziridines for use in this invention include ethylenimine and such alkyl substituted aziridines as 1,2-propylenimine, 1,2-butylenimine, 2,2-butylenimine, and the like. Preferred aziridines for practice of this invention are ethylenimine and 1,2-propylenimine.

Suitable specific examples of aziridinyl phosphoramides for the present invention include tris(1-aziridinyl) phosphoramides, such as tris(1-aziridinyl) phosphine oxide, tris(2 - methyl - 1 - aziridinyl) phosphine oxide, tris-(2,2-dimethyl-1-aziridinyl) phosphine oxide, tris(2-isopropyl-1-aziridinyl)phosphine oxide, tris(2-n-butyl-1-aziridinyl)phosphine oxide, and the like; bis(1-aziridinyl) phosphoramides, such as bis(1-aziridinyl) (diamino) phosphine oxides, e.g., bis(1-aziridinyl)(dimethylamino) phosphine oxide, bis(1-aziridinyl)(diethylamino) phosphine oxide, bis(1 - aziridinyl)(diisopropylamino)phosphine oxide, and the like; bis(1-aziridinyl)(alkoxy)phosphine oxides, e.g., bis(1-aziridinyl)(methoxy)phosphine oxide, bis(1-aziridinyl)(ethoxy)phosphine oxide, and the like; 1-aziridinyl bis(diamino, or alkoxy) phosphoramides, e.g., 1-aziridinyl bis(dimethylamino) phosphine oxide, 1-aziridinyl bis(diisopropylamino) phosphine oxide, 1-aziridinyl bis(methoxy) phosphine oxide, 1-aziridinyl bis(ethoxy)phosphine oxide, and the like.

In practice, the compounds of this invention are prepared by contacting an aziridine and a 1-aziridinyl phosphoramide in a mole ratio of at least 1:1 in the case of mono(1-aziridinyl alkyl)phosphoramide, at least 2:1 in the case of bis(1-aziridinyl alkyl) phosphoramides, and at least 3:1 in the case of tris(1-aziridinyl alkyl) phosphoramide. The reactants are desirably introduced to a presure vessel, such as a stainless steel bomb, and heated at a tempearture between 50° C. and 250° C., preferably 100° to 175° C., under autogenous pressure for a time sufficient to allow the resulting reaction to go to completion, usually from about 10 minutes to 5 days, depending on the aziridine, the 1-aziridinyl phosphoramide, and the temperature conditions employed.

Pressure additional to that generated autogenically may be employed if desired, but no apparent advantage is obtained thereby.

At least a mole ratio of the aziridine to 1-aziridinyl phosphoramide corresponding to the number of aziridine rings on the 1-aziridinyl phosphoramides should be used in the reaction. Mole ratios from this minimum up to about 50:1 have been found advantageous, with mole ratios of aziridine to 1-aziridinyl phosphoramide of about 10:1 to about 30:1 being preferred.

The reaction may be carried out either in the presence or absence of an inert reaction solvent. As used herein, the term "inert" means that the solvent is non-reactive with the aziridine, the 1-aziridinyl phosphoramide, and the resulting 1-aziridinyl alkyl phosphoramide reaction product under the reaction conditions employed. Suitable specific examples of such inert solvents, which may be used singly or as mixtures, include the lower alcohols, such as methyl alcohol, ethyl alcohol, i-propyl alcohol, n-butyl alcohol and the like; aromatic hydrocarbon solvents, such as benzene, toluene, and the like; aliphatic ketones, such as acetone, methyl ethyl ketone, and the like, dialkyl ethers, such as diethyl ether, and the like. The preferred inert reaction solvent is ethyl alcohol.

The reaction between the aziridine and the 1-aziridinyl phosphoramide should be carried to completion. If the reaction is incomplete, the resulting product tends to be unstable with respect to polymerization.

The 1-aziridinyl alkyl phosphoramides of this invention are useful as curing agents for a wide variety of polymers, for example, styrene-maleic anhydride copolymers, acid terminated polymers (e.g. carboxy-terminated polybutadiene), and the like. The novel bis and tris (1-aziridinyl alkyl) phosphoramides are particularly useful for curing carboxy terminated polymers because they do not isomerize during curing, nor do they undergo cure reversion.

DESCRIPTION OF THE PREFERRED EMBODIMENTS

The following non-limiting examples describe preferred embodiments and illustrate the invention further.

EXAMPLE 1

A stainless steel bomb was charged with 25.4 grams of an 80 percent by weight solution in ethyl alcohol of tris(1-aziridinyl) phosphine oxide (0.117 mole) and 300 ml. of ethylenimine (5.80 moles). The bomb was closed, heated at 120° C. for 5½ hours and allowed to cool. Removal of the excess ethylenimine under vacuum left 38.8 g. (100 percent yield) of a clear, viscous liquid which was analyzed by infrared spectroscopy and found to have a spectrum consistent with the following structure:

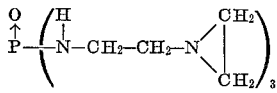

The compound of Example 1 was found to be useful as a curing agent for preparing coating compositions as follows:

A 1 g. sample of a copolymer of styrene-maleic anhydride (50 percent by weight of maleic anhydride, approximately a 1:1 mole ratio) was dissolved in 5 ml. of methyl ethyl ketone. A second solution, consisting of 0.50 g. of the compound of Example 1 dissolved in 5 ml. of methyl ethyl ketone, was mixed with the first solution. The resulting mixture was poured onto a bonderized steel panel (4 x 12 x 1/16 inches). The solvent was evaporated and a film of 0.5 mil (0.0005 inch) thickness resulted. This film was cured at 140° C. for 30 minutes. The cured coating had excellent adhesion properties, was not affected by water and had good impact strength on the surface of the film.

EXAMPLE 2

A product similar to that of Example 1 is obtained when ethylenimine and bis(1-aziridinyl)(dimethylamino)-phosphine oxide in a mole ratio of 10:1 are allowed to react under the same conditions as in Example 1.

EXAMPLE 3

A product similar to that of Examples 1 and 2 is obtained when 1,2-propylenimine and tris(1-aziridinyl) phosphine oxide in a mole ratio of 15:1 are allowed to react under the same conditions as in Example 1.

What is claimed is:

1. A compound of the formula:

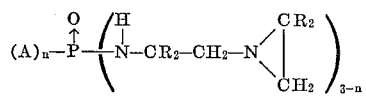

wherein:
(1) R is, independently in each case, hydrogen or an alkyl group having from 1 to 4 carbon atoms,
(2) A is $(R_1)_2N-$,
(3) $R_1$ is an alkyl group having from 1 to 4 carbon atoms, and
(4) $n$ is 0 or 1.

2. A compound as in claim 1 wherein $n$ is 0 and R is hydrogen.
3. A compound as in claim 1 wherein $n$ is 0 and R is hydrogen or methyl.
4. A compound as in claim 1 wherein $R_1$ is methyl, ethyl or isopropyl.

References Cited

UNITED STATES PATENTS

| | | | |
|---|---|---|---|
| 2,889,289 | 6/1959 | Reeves et al. | 260—239 |
| 3,359,259 | 12/1967 | Ham | 260—239 |

FOREIGN PATENTS

| | | |
|---|---|---|
| 63,864 | 8/1949 | Netherlands. |

ALTON D. ROLLINS, Primary Examiner

U.S. Cl. X.R.

117—132; 260—88.1, 94.2